US008811227B2

(12) United States Patent
Sasso et al.

(10) Patent No.: US 8,811,227 B2
(45) Date of Patent: Aug. 19, 2014

(54) MERGING A STAND-ALONE SWITCH TO A FIBRE CHANNEL NETWORK

(75) Inventors: Christian Sasso, Milpitas, CA (US);
Siddharth Kasat, San Jose, CA (US);
Ankur Goyal, San Jose, CA (US);
Amitkumar Patel, Fremont, CA (US);
Kishan Kumar Kotari Uppanda,
Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 145 days.

(21) Appl. No.: 13/176,940

(22) Filed: Jul. 6, 2011

(65) Prior Publication Data

US 2013/0010638 A1   Jan. 10, 2013

(51) Int. Cl.
*H04L 12/54*   (2013.01)
*H04L 12/56*   (2006.01)

(52) U.S. Cl.
CPC ............. *H04L 49/357* (2013.01); *H04L 49/65* (2013.01)
USPC ............ 370/254; 370/238; 370/351; 370/217

(58) Field of Classification Search
CPC ............ H04W 4/18; H04W 29/12886; H04W 49/357
USPC ......... 370/401, 251–254, 351–354, 389, 392, 370/398, 360, 395.1, 395.7, 396, 447; 709/220, 223, 227, 238
See application file for complete search history.

(56) References Cited

U.S. PATENT DOCUMENTS

| 7,230,929 | B2 * | 6/2007 | Betker et al. .................. 370/254 |
| 7,606,167 | B1 * | 10/2009 | DeSanti et al. ............... 370/254 |
| 7,830,880 | B2 | 11/2010 | Sasso et al. |
| 7,876,707 | B2 | 1/2011 | Sasso et al. |
| 7,936,769 | B2 * | 5/2011 | Chung et al. .................. 370/401 |

(Continued)

OTHER PUBLICATIONS

S. Wilson et al., Fibre Channel, Switch Fabric-5 (FC-SW-5) Rev. 8.5 INCITS working draft proposed, American National Standard for Information Technology, Jun. 3, 2009 (310 pages).

*Primary Examiner* — Dang Ton
*Assistant Examiner* — Sai Aung
(74) *Attorney, Agent, or Firm* — Edell, Shapiro & Finnan, LLC

(57) ABSTRACT

A Fiber Channel (FC) switch and related methods are provided for merging the FC switch with an existing FC network. During a merge process of a stand-alone switch with an FC network, a first Exchange Fabric Parameters (EFP) frame is sent from the stand-alone switch to an FC switch in the existing FC network. The first EFP frame has an empty domain identifier (ID) list. The stand-alone switch receives a second EFP frame from the FC switch. The second EFP frame contains a domain ID list of domain IDs already in use in the FC network. The stand-alone switch compares the domain ID list in the second EFP frame with a stored list of one or more domain IDs associated with the stand-alone switch to determine if there is a domain ID overlap or conflict. If no conflict is detected, the stand-alone switch merges with the existing network without initiating a Build Fabric phase or a Principal Switch Selection phase that could cause disruption of traffic in the network.

13 Claims, 4 Drawing Sheets

(56) References Cited

U.S. PATENT DOCUMENTS

| | | |
|---|---|---|
| 8,098,595 B2 * | 1/2012 | Desanti et al. ............... 370/254 |
| 2004/0013092 A1 * | 1/2004 | Betker et al. ................. 370/254 |
| 2005/0213561 A1 * | 9/2005 | Yao et al. ..................... 370/351 |
| 2007/0201457 A1 * | 8/2007 | Betker et al. ................. 370/360 |
| 2008/0112311 A1 * | 5/2008 | Hariharan et al. ........... 370/217 |
| 2009/0067430 A1 * | 3/2009 | Sasso et al. .................. 370/394 |
| 2009/0327518 A1 * | 12/2009 | DeSanti et al. .............. 709/238 |
| 2010/0214950 A1 * | 8/2010 | Vobbilisetty ................. 370/254 |

* cited by examiner

MERGING A STAND-ALONE SWITCH TO A FIBRE CHANNEL NETWORK

TECHNICAL FIELD

The present disclosure relates to the merging of a stand-alone switch to a Fibre (Fiber) Channel network.

BACKGROUND

In a Fibre Channel (FC) network, FC switches are deployed to direct traffic between, for example, host server devices and storage array devices. Each FC switch can serve devices in multiple runtime domains that are identified by a domain identifier (ID). The domain ID is an 8-bit identifier with a range of 1-239. As such, each switch has one or more domain IDs associated therewith that reflect the runtime domains serviced by the switch.

Network operators are often required to increase the size and functionality of an existing FC network. This is commonly done through the addition of a single stand-alone FC switch to the existing network.

DESCRIPTION OF EXAMPLE EMBODIMENTS

Overview

A Fibre (Fiber) Channel (FC) switch and related methods are provided for merging the FC switch with an existing FC network. During a merge process of a stand-alone switch with an FC network, a first Exchange Fabric Parameters (EFP) frame is sent from the stand-alone switch to an FC switch in the existing FC network. The first EFP frame has an empty domain identifier (ID) list. The stand-alone switch receives a second EFP frame from the FC switch. The second EFP frame contains a domain ID list of domain IDs already in use in the FC network. The stand-alone switch compares the domain ID list in the second EFP frame with a stored list of one or more domain IDs associated with the stand-alone switch in order to determine if there is a domain ID overlap or conflict. If no conflict is detected, the stand-alone switch merges with the existing network without initiating a Build Fabric phase or a Principal Switch Selection phase that could cause disruption of traffic in the network.

Example Embodiments

Figure 1:
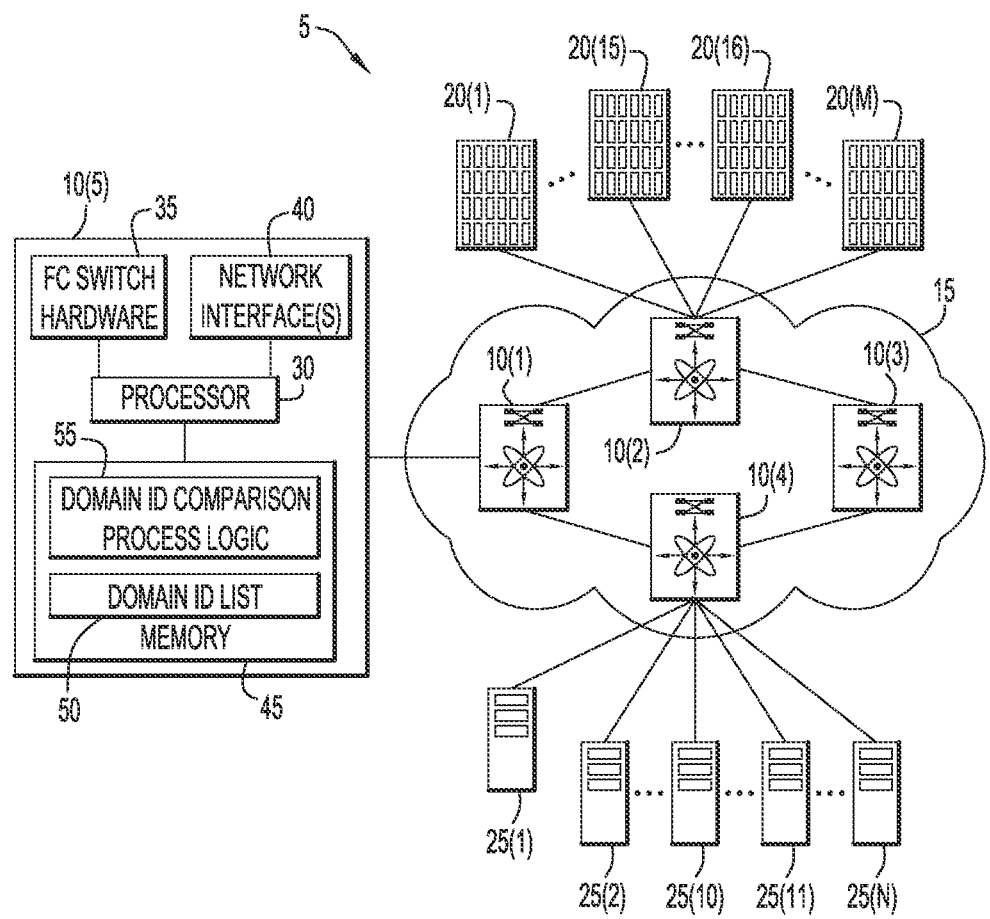
FIG. 1 is a block diagram showing an example of a stand-alone switch that is configured to merge with an existing FC network through the delivery of an Exchange Fabric Parameters (EFP) frame having an empty domain ID list to the FC network.

Referring first to FIG. 1, an example of an FC network is generally shown at reference numeral 5. In this example, FC network 5 is a virtual storage area network (VSAN) and comprises a plurality of FC switches 10(1)-10(4), network connections (schematically represented by cloud 15) between the switches and other elements, FC storage arrays 20(1)-20(M), and host servers 25(1)-25(N).

In the arrangement of FIG. 1, an additional switch 10(5) is a stand-alone switch that is to be merged with existing FC network 5. Switch 10(5) comprises a processor 30, FC switch hardware 35, network interface(s) 40 and memory 45. Memory 45 includes a domain ID list 50 and domain ID comparison process logic 55. The domain ID list 50 contains a list of domain IDs for runtime domains that may be serviced by the switch 10(5).

FC switches 10(1)-10(4) are part of the existing stable network. Each FC switch 10(1)-10(4) connects to other FC switches, and some edge FC switches also connect to FC devices. For example, switch 10(1) is configured to connect to switch 10(5), while switch 10(4) is configured to connect to servers 25(1)-25(N). Servers 25(1)-25(N) may be in one or more different runtime domains. Similarly, switch 10(2) connects to a plurality of FC storage arrays 20(1)-20(M) that may be in one or more different runtime domains. Thus, there are several runtime domains already in use in a given FC network, each of which are associated with a switch.

In certain networks, when a stand-alone FC switch is merged into an existing FC network, the stand-alone FC switch will have one or more predetermined or default domain IDs assigned to it. The stand-alone FC switch initiates the merge by sending an EFP frame to a switch within the FC network. The EFP frame comprises a domain ID list that includes the domain ID assigned to the stand-alone switch, as well as other information, such as information regarding a principal switch. One or more network switches receive this EFP frame and evaluate the domain ID list received from the stand-alone FC switch to determine if the domain ID(s) of the stand-alone switch is/are in conflict with (i.e., is/are the same as) any domain IDs already in use in the FC network. If there is a conflict between the domains IDs of the stand-alone switch and the domain IDs in use in the FC network, the ports used for communication of the EFP frame are isolated from other ports in the network. If there is no conflict, a Build Fabric phase is initiated, followed by a Principal Switch Selection phase and then a Domain ID Distribution phase in which the principal switch will distribute domain IDs using a protocol. The Build Fabric and Principal Switch Selection phases involve all the switches in the network, and together take at least 15 seconds to complete (i.e., approximately 5 seconds to complete the Build Fabric phase and approximately 10 seconds to complete the Principal Switch Selection phase). As such, the time required to complete the merge of the stand-alone switch with the network may disrupt traffic within the network. Additionally, when the reconfiguration is triggered on several VSANs at once, there is a risk of excessive loads on the processors that may lead to isolated ports. In the worst case scenario, excessive processor loads can lead to systems that are so unstable that a manual reboot is required for correction.

In accordance with certain aspects described herein, switch 10(5) is configured to merge with existing FC network 5 without requiring a Build Fabric phase or a Principal Switch Selection phase. As such, the merge of switch 10(5) with existing FC network 5 may be substantially instantaneous so as not to disrupt traffic within the network. This instantaneous merge that avoids the Build Fabric and Principal Switch Selection phases may take only a few milliseconds, which is substantially less than the approximately 15 seconds required to complete both phases. The instantaneous merge is facilitated by stand-alone switch 10(5) and more particularly through the execution of domain ID comparison process logic 55 in memory 45. As a result of this instantaneous merge, the stand-alone switch 10(5) also accepts the principal switch of FC network 5 as its own principal switch.

Still referring to FIG. 1, memory 45 may comprise read only memory (ROM), random access memory (RAM), magnetic disk storage media devices, optical storage media devices, flash memory devices, electrical, optical, or other physical/tangible memory storage devices. Processor 30 is, for example, a microprocessor or microcontroller that executes instructions for the domain ID comparison process logic 55. Thus, in general, the memory 45 may comprise one or more computer readable storage media (e.g., a memory device) encoded with software comprising computer executable instructions and when the software is executed (by processor 30) it is operable to perform the operations described herein in connection with domain ID comparison process logic 55. Further details of such operations are provided below with reference to FIGS. 2-4.

Stand-alone switch 10(5) includes FC switch hardware 35 that comprises digital logic and other circuitry configured to perform the FC switching operations in an FC network. The FC switch hardware 35 may be implemented by one or more application specific integrated circuits (ASICs). The network interface(s) 40 include suitable FC interfaces, such as ports, for connection to an FC network and also to any other network for control/command functions associated with switch 10(5).

Figure 2A:
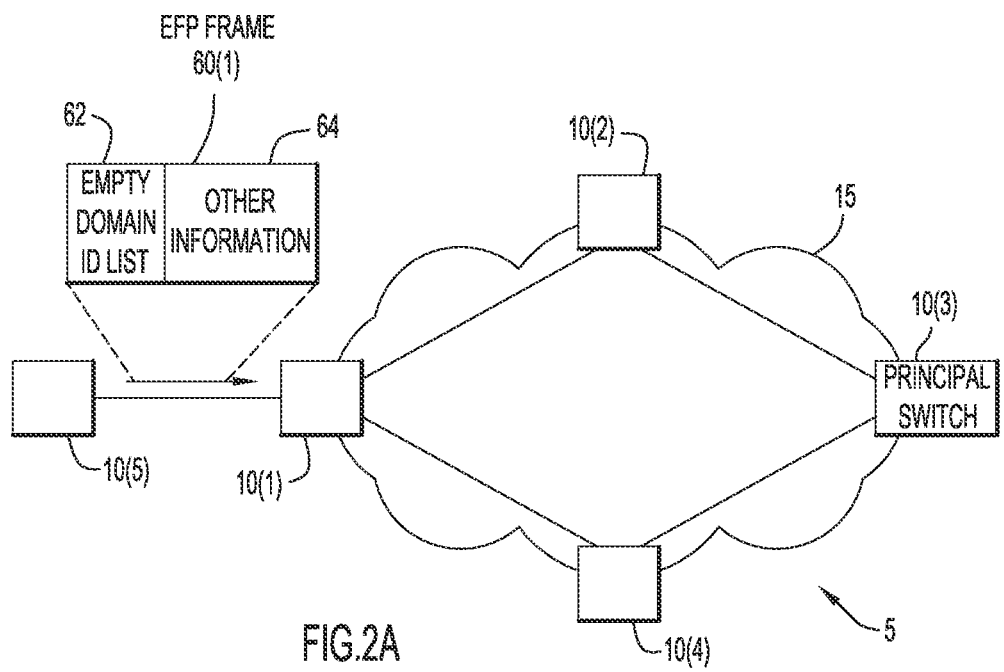
FIG. 2A is a diagram illustrating an example of the transmission of the EFP frame having an empty domain ID list from the stand-alone switch to the existing FC network.
Figure 2B:
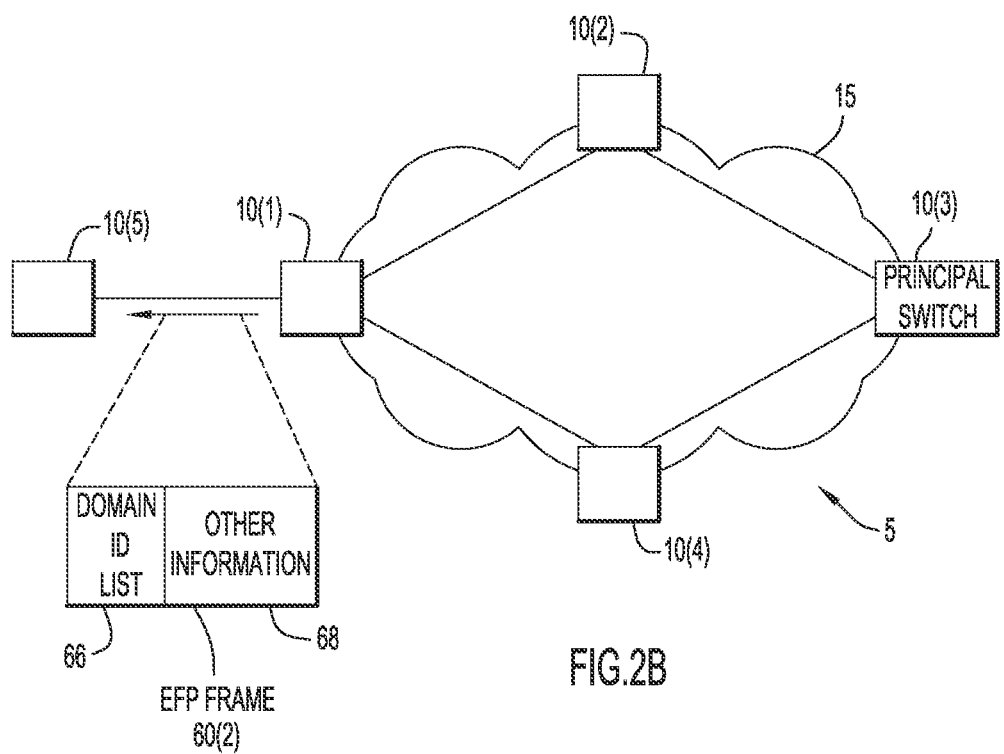
FIG. 2B is a diagram illustrating an example of the transmission of an EFP frame from the FC network to the stand-alone switch in response to receipt of the frame having an empty domain ID list.

FIGS. 2A and 2B are diagrams illustrating a merge between stand-alone switch 10(5) and existing network 5. For ease of illustration, only switches 10(1)-10(4) are shown and other elements, such as host servers 25(1)-25(N) and FC storage arrays 20(1)-20(M) have been omitted.

As explained above, techniques are provided in which switch 10(5) may be merged with FC network 5 without requiring a Build Fabric phase or a Principal Switch Selection phase. To accomplish this instantaneous merge, switch 10(5) begins the merge by sending an EFP frame 60(1) to switch 10(1) in network 5. As schematically shown in FIG. 2A, EFP frame 60(1) includes two parts: a domain ID list 62 (i.e., list of assigned domain IDs), and a portion 64 containing other information (i.e., information regarding the principal switch, etc.). However, in the arrangement of FIG. 2A, domain ID list 62 of EFP frame 60(1) is empty and does not include the domain ID(s) associated with switch 10(5).

The FC standard calls for a comparison of the domain ID list 62 in the received EFP frame 60(1) to the domain ID list for the network in order to check for domain ID conflicts. Because the received domain ID list 62 is empty, a conflict in domain IDs will not be detected. However, in practice and as noted above, stand-alone switch 10(5) will have one or more domain IDs associated therewith because it will, at least, assign a default to itself or have a domain otherwise previously assigned.

Because domain ID list 62 in EFP frame 60(1) is empty, switch 10(5) is viewed as an un-configured switch (i.e., no domain ID yet assigned). As such, as shown in FIG. 2B, a switch in FC network 5, e.g., switch 10(1), replies to the EFP frame 60(1) by sending an EFP frame 60(2) back to switch 10(5). This EFP frame 60(2) attempts to provide switch 10(5) with a new domain ID, and includes a list 66 of the domain IDs already in use in network 5. That is, in contrast to EFP frame 60(1), this second EFP frame 60(2) includes a non-empty domain ID list 66. EFP frame 60(2) also includes a portion 68 containing other information.

As noted above, stand-alone switch 10(5) includes memory 45 that stores domain ID list 50. Domain ID list 50 is the list of one or more predetermined or default domain IDs assigned to switch 10(5). Stand-alone switch 10(5) uses this stored list 50, as well as the received EFP frame 60(2), to determine if the switch can merge with FC network 5 without the requirement of a Build Fabric phase or a Principal Switch Selection phase. More specifically, processor 30 executes domain ID comparison process logic 55 to compare the list of domain IDs contained in the EFP frame 60(2) with the one or more domain IDs in domain ID list 50 to determine if there is a conflict between any domain IDs. That is, processor 30 determines if any of the domain IDs in the list received from switch 10(1) are the same as at least one of the domain IDs in domain ID list 50. If no conflict is detected, switch 10(5) is permitted to instantly merge with FC network 5 (i.e., without the requirement of a Build Fabric phase or a Principal Switch Selection phase). Additionally, this merge occurs such that the principal switch of FC network 5 (in this example, switch 10(3)), does not change as a result of the merge. In other words, switch 10(5) automatically accepts switch 10(3) as its principal switch.

More specifically, if stand-alone switch 10(5) determines that there are no conflicts between domain IDs contained in the EFP frame 60(2) with the one or more domain IDs in domain ID list 50, switch 10(5) will not start a Build Fabric phase, but will instead wait to receive a DIA_REQUEST from the stable FC network side. The stable FC network 5, because it received EFP frame 60(1) containing an empty domain ID list will not detect a conflict, so a switch in the FC network 5 will send the DIA_REQUEST to the stand-alone switch 10(5).

In certain circumstances, a conflict between a domain ID of a network switch and a domain ID stored in domain ID list 50 may occur. Further details of the operations performed after detecting such a conflict are described below with reference to FIG. 4.

Figure 3:
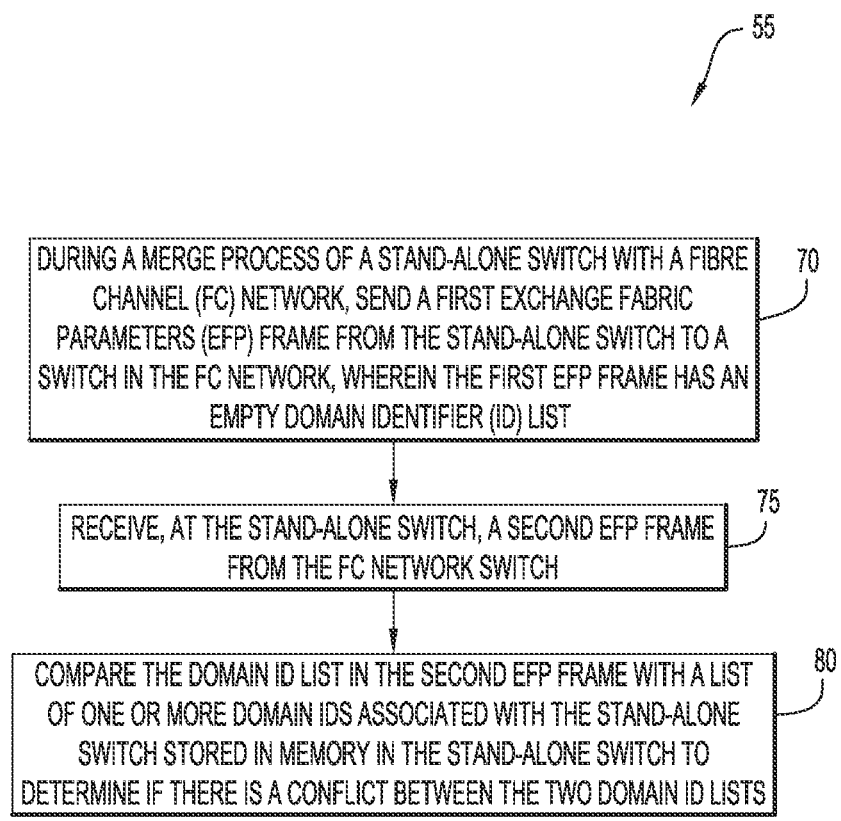
FIG. 3 is a high level flowchart illustrating example operations performed during merge of the stand-alone switch with the existing FC network.

FIG. 3 is a high level flowchart of the operations implemented to determine if the instantaneous merge of a switch is possible. For convenience, the example of FIG. 3 will be described with reference to the configurations shown in FIGS. 1 and 2.

At 70, during a merge process of stand-alone switch 10(5) with FC network 5, the stand-alone switch sends a first EFP frame 60(1) to switch 10(1) in the network. As noted above, the EFP frame 60(1) has an empty domain ID list.

At 75, stand-alone switch 10(5) receives a second EFP frame 60(2) from FC switch 10(1). At 80, stand-alone switch 10(5) compares the domain ID list 66 in the second EFP frame 60(2) with a list of one or more domain IDs associated with stand-alone switch 10(5). These domain IDs are stored in domain ID list 50. The comparison determines if there is a conflict between the two domain ID lists.

As previously noted, in certain networks, when a stand-alone FC switch is merged into an existing FC network, both a Build Fabric phase and a Principal Switch Selection phase are initiated. However, this may, in certain circumstances, result in a situation in which the stand-alone switch becomes the principal switch of the FC network. In other words, the newly added switch does not accept the FC network's principal switch as its own, even though the configured priority of the switches in the network has not changed. This situation can result from the relative time delays caused by the Build Fabric phase and a Principal Switch Selection phases. Also as noted above, techniques provided herein are directed to a stand-alone switch configured to merge with an existing FC network without necessarily requiring a Build Fabric phase and a Principal Switch Selection phase, thereby preventing the above situation.

Figure 4:
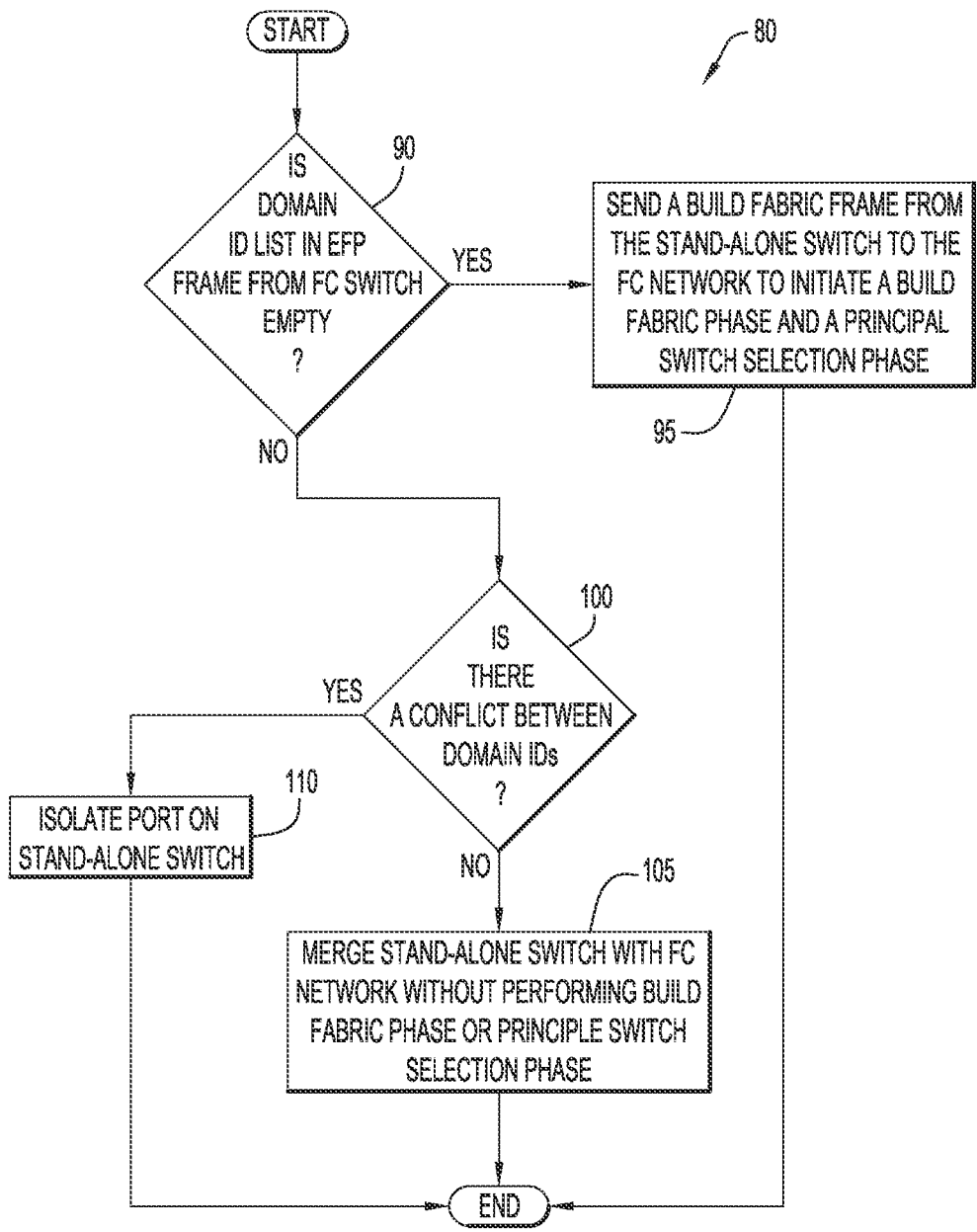
FIG. 4 is a flowchart illustrating operations performed to complete the merge of the stand-alone switch with the existing FC network

FIG. 4 is a generic flowchart illustrating operations performed when a stand-alone switch merges with an existing FC network. Because FIG. 4 is generic, the flowchart covers scenarios in which the Build Fabric phase and Principal Switch Selection phases are not performed, as well as scenarios in which such phases are initiated.

FIG. 4 depicts, in more detail, examples of the comparison operation 80 performed by stand-alone switch 10(5) after receiving EFP frame 60(2). First, after EFP frame 60(2) is received, at 90, stand-alone switch 10(5) determines if the domain ID list 66 in EFP frame 60(2) is empty. The situation where the EFP frame 60(2) contains an empty domain ID list is an unusual case where the switch that responds to the EFP frame 60(1) from the stand-alone switch is another stand-alone or non-configured FC switch. If the domain ID list 66 is empty, at 95, stand-alone switch 10(5) sends a Build Fabric frame to switch 10(1). This initiates a Build Fabric phase, followed by a Principal Switch Selection phase in the network. After completion of these phases, switch 10(5) is merged with network 5.

If at 90, it is determined that domain ID list 66 in EFP frame 60(2) is not empty, at 100 a determination is made as to whether there is a conflict between domain IDs in list 66 and the domain IDs in list 50. As noted above, if there is no conflict, switch 10(5) instantaneously merges with FC network 5 at 105 without requiring a Build Fabric phase or a Principal Switch Selection phase. Additionally, the merge does not affect the designation of the principal switch in network 5. That is, switch 10(5) accepts the principal switch designation already selected in network 5. If, at 100, a conflict is detected, at 110 stand-alone switch 10(5) isolates the port it used to communicate with switch 10(1) from all other ports in the network.

It should be noted that when stand-alone switch 10(5) isolates the port it used to communicate with switch 10(1), both sides of the communication link will end up isolated. This symmetrical isolation results from the fact that switch 10(5) isolates its port due to the detected conflict, and, when the DIA_REQUEST frame is received on the isolated port, a DIA_REJECT frame is sent back to the FC network 5. The other side of the link is then isolated when the DIA_REJECT frame is received.

The techniques described herein are advantageous in that backward compatibility with conventional existing network devices is supported because only the added stand-alone switch needs to support the new capabilities. Additionally, these techniques increase the scalability of the overall FC network and reduce concerns that the addition of a switch will disrupt traffic because there is not necessarily a requirement to reconfigure the FC network when the switch is added.

The above description is intended by way of example only.

What is claimed is:

1. A method comprising:
   during an instantaneous merge process of a stand-alone switch with a Fibre Channel (FC) network, sending a first Exchange Fabric Parameters (EFP) frame from the stand-alone switch to an FC switch in the FC network, wherein the first EFP frame has an empty domain identifier (ID) list;
   receiving, at the stand-alone switch, a second EFP frame from the FC switch, the second EFP frame containing a domain ID list of domain IDs already in use in the FC network; and
   comparing the domain ID list in the second EFP frame with a stored domain ID list of one or more domain IDs associated with the stand-alone switch to determine if there is a conflict between the domain ID list stored in the stand-alone switch and the domain ID list in the second EFP frame,
   wherein the stored domain ID list of one or more domain IDs associated with the stand-alone switch is not sent to the FC switch in the FC network, and
   wherein the instantaneous merge process does not include a Build Fabric Phase and a Principal Switch Selection Phase.

2. The method of claim 1, further comprising:
   determining that there is a conflict between a domain ID in the list received from the FC switch and at least one of the one or more domain IDs stored in the stand-alone switch; and
   isolating a port on the stand-alone switch that communicates with the FC switch from other ports in the FC network.

3. The method of claim 1, further comprising:
   receiving one or more domain IDs from a selected principal switch in the FC network.

4. An apparatus comprising:
   a stand-alone switch, the stand-alone switch comprising:
   a network interface unit configured to enable communications over a Fibre Channel (FC) network;
   a memory that is configured to store a domain identifier (ID) list comprising one or more domain IDs; and
   a processor coupled to the network interface unit and to the memory, the processor configured to:
   during an instantaneous merge process between the stand-alone switch and an FC network, send a first Exchange Fabric Parameters (EFP) frame to an FC switch in the FC network, wherein the first EFP frame has an empty domain ID list;
   receive a second EFP frame from the FC switch, the second EFP frame containing a domain ID list of domain IDs already in use in the FC network; and
   compare the domain ID list in the second EFP frame with the list of one or more domain IDs stored in the memory to determine if there is a conflict between the stored domain ID list and the domain ID list in the second EFP frame;
   wherein the domain ID list comprising one or more domain IDs stored in the memory is not sent to the FC switch in the FC network, and
   wherein the instantaneous merge process does not include a Build Fabric Phase and a Principal Switch Selection Phase.

5. The apparatus of claim 4, wherein if the processor determines that there is a conflict between a domain ID in the list received from the FC switch and the one or more domain IDs stored in the memory, the processor is further configured to:
   isolate a port that communicates with the FC switch from other ports in the FC network.

6. The apparatus if claim 4, wherein the processor is further configured to receive one or more domain IDs from a selected principal switch in the FC network.

7. One or more non-transitory computer readable storage media encoded with software comprising computer executable instructions and when the software is executed operable to:
   during an instantaneous merge process of a stand-alone switch with a Fibre Channel (FC) network, send a first Exchange Fabric Parameters (EFP) frame from the stand-alone switch to an FC switch in the FC network, wherein the first EFP frame has an empty domain identifier (ID) list;

receive, at the stand-alone switch, a second EFP frame from the FC switch, the second EFP frame containing a domain ID list of domain IDs already in use in the FC network; and compare the domain ID list in the second EFP frame with a domain ID list of one or more domain IDs associated with the stand-alone switch stored in a memory in the stand-alone switch to determine if there is a conflict between the list stored in the stand-alone switch and the domain ID list in the second EFP frame, wherein the domain ID list of one or more domain IDs associated with the stand-alone switch is not sent to the FC switch in the FC network, and wherein the instantaneous merge process does not include a Build Fabric Phase and a Principal Switch Selection Phase.

8. The non-transitory computer readable storage media of claim 7, further comprising instructions operable to:

determine that there is a conflict between a domain ID in the list received from the FC switch and at least one of the one or more domain IDs stored in the stand-alone switch; and isolate a port on the stand-alone switch that communicates with the FC switch from other ports in the network.

9. A method comprising:

during a merge process of a stand-alone switch with a Fibre Channel (FC) network, sending a first Exchange Fabric Parameters (EFP) frame from the stand-alone switch to an FC switch in the FC network, wherein the first EFP frame has an empty domain identifier (ID) list;

receiving, at the stand-alone switch, a second EFP frame from the FC switch;

determining, at the stand-alone switch, if a Build Fabric phase and a Principal Switch Selection phase is required for merge of the stand-alone switch with the FC network by comparing a domain ID list contained in the second EFP frame comprising a list of domain IDs already in use in the FC network with a list of one or more domain IDs associated with the stand-alone switch stored in the stand-alone switch to determine if there is a conflict between the domain ID list stored in the stand-alone switch and the domain ID list in the second EFP frame; and wherein the stored domain ID list of one or more domain IDs associated with the stand-alone switch is not sent to the FC switch.

10. The method of claim 9, wherein if it is determined that a Build Fabric phase and a Principal Switch Selection phase are required, further comprising:

isolating a port on the stand-alone switch that communicates with the FC switch from other ports in the network.

11. The method of claim 9, wherein if it is determined that a Build Fabric phase and a Principal Switch Selection phase are not required further comprises:

completing merge of the stand-alone switch with the FC network without initiating a Build Fabric phase or a Principal Switch Selection phase.

12. The method of claim 9, wherein determining if a Build Fabric phase and a Principal Switch Selection phase is required for merge of the stand-alone switch with the FC network comprises:

determining if the domain ID list in the second EFP frame received from the FC switch is empty.

13. The method of claim 12, further comprising:

sending a Build Fabric frame to the FC network so as to initiate the Build Fabric phase and the Principal Switch Selection phase.

* * * * *